US008957699B2

United States Patent
Eastin (10) Patent No.: US 8,957,699 B2
(45) Date of Patent: Feb. 17, 2015

(54) EFFICIENT TOFFOLI STATE GENERATION FROM LOW-FIDELITY SINGLE QUBIT MAGIC STATES

(71) Applicant: Bryan K. Eastin, Lafayette, CO (US)

(72) Inventor: Bryan K. Eastin, Lafayette, CO (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 179 days.

(21) Appl. No.: 13/765,377

(22) Filed: Feb. 12, 2013

(65) Prior Publication Data

US 2014/0118024 A1 May 1, 2014

Related U.S. Application Data

(60) Provisional application No. 61/719,073, filed on Oct. 26, 2012.

(51) Int. Cl.
*H03K 19/195* (2006.01)
*G06N 99/00* (2010.01)
*B82Y 10/00* (2011.01)

(52) U.S. Cl.
CPC ............... *G06N 99/002* (2013.01); *B82Y 10/00* (2013.01)
USPC .............................................. 326/7; 327/366

(58) Field of Classification Search
USPC ................................ 326/7; 327/186, 366, 527
See application file for complete search history.

(56) References Cited

U.S. PATENT DOCUMENTS 7,346,246 B2 *  3/2008   Munro et al. ................. 385/122

FOREIGN PATENT DOCUMENTS

WO     WO 2006/019858 A2    2/2006
WO     WO 2012/082906 A1    6/2012

OTHER PUBLICATIONS

Aliferis: "*Level Reduction and the Quantum Threshold Theorem*"; Thesis in partial fulfillment of the Requirements for the Degree of Doctor of Philosophy, California Institute of Technology, Dec. 11, 2006, pp. 1-125

Bravyi et al: "*Magic State Distillation with Low Overhead*", IBM Watson Research Center, Yorktown Heights, NY 10598; Institute for Quantum Information and Matter, California Institute of Technology, Pasadena, CA 91125, Sep. 12, 2012, pp. 1-11.

(Continued)

*Primary Examiner* — Daniel D Chang
(74) *Attorney, Agent, or Firm* — Tarolli, Sundheim, Covell & Tummino LLP (57) ABSTRACT

Systems and methods are provided for generating a high-fidelity Toffoli state from a plurality of low-fidelity single qubit magic states. First and second qubits are prepared in a high-fidelity initial state. N target qubits are prepared in the single qubit magic state. A series of gates are performed on the qubits, such that the system is in a state $\frac{1}{2}|000_1 \ldots 0_N\rangle + \frac{1}{2}|010_1 \ldots 0_N\rangle + \frac{1}{2}|100_1 \ldots 0_N\rangle + \frac{1}{2}|111_1 \ldots 1_N\rangle$. A parity check is performed on the N target qubits. The parity check provides at least a first measurement value. The first qubit, the second qubit, and the first target qubit are accepted as the Toffoli state if the measurement values assume the desired values.

20 Claims, 3 Drawing Sheets

(56) References Cited

OTHER PUBLICATIONS

Bravyi et al 2: "*Universal Quantum Computation with Ideal Clifford Gates and Noisy Ancillas*", The American Physical Society, Physical Review A 71, Feb. 22, 2005, pp. 022316-1 thru 022316-14.

Fowler et al.: "*High Threshold Universal Quantum Computation on the Surface Code*", Centre for Quantum Computer Technology, University of Melbourne, Victoria, Australia; Institute for Quantum Computing, University of Waterloo, Waterloo, ON, Canada, Dec. 2, 2009pp. 1-18.

Knill: "*Fault-Tolerant Postselected Quantum Computation: Schemes*", Mathematical and Computational Sciences Division, National Institute of Standards and Technology, Boulder, CO 80305, Feb. 1, 2008, pp. 1-17.

Meier et al.: "*Magic-State Distillation with the Four-Qubit Code*", University of Colorado, Boulder, CO; National Institute of Standards and Technology, Boulder, CO; Northrop Grumman Corporation, Baltimore, MD, Apr. 20, 2012, pp. 1-10.

Raussendorf et al: "*A Fault-Tolerant One-Way Quantum Computer*", Institute for Quantum Information, California Institute of Technology, Pasadena, CA 91125; Los Alamos National Laboratory, Biological and Quantum Physics, MS D454, Los Alamos, NM 87545, Feb. 1, 2008, pp. 1-26.

Copending US Application: "*Efficient Resource State Distillation*"; pp. 1-31, U.S. Appl. No. 13/765,332, filed Feb. 12, 2013.

International Search Report for corresponding PCT/US2013/064343, completed Feb. 21, 2014 by Paul Schenkels of the EPO.

Chen, et al.: "*Implementation of a Three-Qubit Toffoli Gate in a Single Step*"; Physical Review A(Atomic, Molecular, and Optical Physics) American Physical Society USA, vol. 85, No. 3, Mar. 2012, XP002720568, ISSN: 1050-2947, entire document.

Eastin: "*Distilling One-Qubit Magic States into Toffoli States*", Physical Review A (Atomic, Molecular, and Optical Physics) American Physical Society USA, vol. 87, No. 3, Mar. 2013, XP002720569, ISSN: 1050-2947, entire document.

Meier, et al.: "*Magic-State Distillation with the Four-Qubit Code*", Retrieved from the Internet: URL:http://arxiv.org/pdf/1204.4221.pdf, [retrieved on Feb. 19, 2014], entire document.

\* cited by examiner

EFFICIENT TOFFOLI STATE GENERATION FROM LOW-FIDELITY SINGLE QUBIT MAGIC STATES

RELATED APPLICATIONS

This application claims priority from U.S. Patent Application Ser. No. 61/719,073, filed 26 Oct. 2012, which is incorporated herein in its entirety.

TECHNICAL FIELD

This invention relates to quantum computing, and more particularly, to the efficient generation of Toffoli states from low-fidelity single qubit states.

BACKGROUND

A classical computer operates by processing bits (binary digits) of information that change state according to the laws of classical physics. These information bits can be modified by using simple logic gates such as AND and OR gates. The bits are physically represented by a high or a low voltage occurring at the output of the logic gate, corresponding either to a logical one (e.g., high voltage) or a logical zero (e.g., low voltage). A classical algorithm, such as one that multiplies two integers, can be decomposed into a long string of these simple logic gates. Like a classical computer, a quantum computer also has bits and gates. Instead of storing exclusively logical ones and zeroes, a quantum bit ("qubit") can store any quantum mechanical superposition of the two, in some sense allowing a qubit to be in both classical states simultaneously. This ability enables a quantum computer to solve certain problems with exponentially greater efficiency than that of a classical computer.

SUMMARY OF THE INVENTION

In accordance with an aspect of the present invention, a method is provided for generating a Toffoli state, having a first fidelity, from a plurality of single qubit magic states having a second fidelity such that using the single qubit magic states to construct a Toffoli state directly would result in a Toffoli state with fidelity less than the first fidelity. Each of first and second qubits are prepared in a high-fidelity state that can be generated with a set of Clifford gates. N target qubits are prepared in the single qubit magic state, where N is an integer greater than one. A series of gates are performed on the first qubit, the second qubits, and the N target qubits, such that a system comprising the first qubit, the second qubits, and the N target qubits is in a state $\frac{1}{2}|000_1 \ldots 0_N\rangle + \frac{1}{2}|010_1 \ldots 0_N\rangle + \frac{1}{2}|100_1 \ldots 0_N\rangle + \frac{1}{2}|111_1 \ldots 1_N\rangle$, wherein the indexed values 1 through N represent the N target qubits. A parity check is performed on the N target qubits to verify that a first target qubit is in a same state as the other target qubits. The parity check provides at least a first measurement value. The first qubit, the second qubit, and the first target qubit are accepted as the Toffoli ancilla state if the measurement values assume a desired value.

In accordance with another aspect of the present invention, a system is provided for generating three qubits in a high-fidelity Toffoli state from a plurality of instances of a magic state. First and second qubits each store a high-fidelity state that can be generated by Clifford gates. N target qubits each store an instance of the magic state. A Toffoli state preparation component is configured to perform a series of gates on the first qubit, second qubit, and the N target qubits to place the system in a state $\frac{1}{2}|000_1 \ldots 0_N\rangle + \frac{1}{2}|010_1 \ldots 0_N\rangle + \frac{1}{2}|100_1 \ldots 0_N\rangle + \frac{1}{2}|111_1 \ldots 1_N\rangle$, wherein the indexed values 1 through N represent the N target qubits. A parity check component is configured to check the parity of the N target qubits. The parity check includes measurements on N−1 target qubits to provide an unmeasured target qubit.

In accordance with yet another aspect of the present invention, a method is provided for generating a Toffoli state, having a first fidelity, from a plurality of single qubit magic states having a second fidelity such that using the single qubit magic states to construct a Toffoli state directly would result in a Toffoli state with fidelity less than the first fidelity. Each of a first set of qubits are prepared in a plus state. Each of a second set of qubits are prepared in one of the plurality of single qubit magic states. Each of a third set of qubits are prepared in one of the plurality of single qubit magic states. For each qubit of the first set of qubits, a controlled NOT (CNOT) operation is performed targeting a corresponding qubit of the second set of qubits, such that the CNOT operation targeting a given one of the second set of qubits is controlled by the corresponding qubit from the first set of qubits. At least one rotation of each qubit of the second set of qubits around an axis of the Bloch sphere is performed using at least one Clifford gate and at least one single qubit magic state stored in the third set of qubits. At least one of the second set of qubits are measured in a measurement basis perpendicular to the axis of the Bloch sphere around which each qubit of the second set of qubits was rotated.

DETAILED DESCRIPTION

In accordance with an aspect of the present invention, a family of routines is provided to provide high-fidelity Toffoli gates from a plurality of input single qubit magic states. Specifically, the systems and methods described herein directly generate high quality Toffoli ancilla states without the need for separate distillation of the input single qubits, resulting in a significant increase in efficiency over separate distillation and generation.

A standard basis for qubit states includes a zero state, denoted herein as |0> and a one state, orthogonal to the zero state and denoted herein as |1>. A sign basis includes a plus state, |+>, defined in the standard basis as $$\frac{1}{\sqrt{2}}|0\rangle + \frac{1}{\sqrt{2}}|1\rangle$$

and a minus state, |−>, defined in the standard basis as $$\frac{1}{\sqrt{2}}|0\rangle - \frac{1}{\sqrt{2}}|1\rangle.$$

A Toffoli state is defined in the standard basis as $\frac{1}{2}|000\rangle + \frac{1}{2}|010\rangle + \frac{1}{2}|100\rangle + \frac{1}{2}|111\rangle$.

A set of universal quantum gates, as the phrase used herein, is any set of quantum gates to which any operation possible on a quantum computer can be reduced, that is, any other unitary operation can be approximated as a finite sequence of gates from the set. Conversely, a non-universal set of gates refers to set of quantum gates that lacks this property. One example of a non-universal set of gates is the set of Clifford gates.

A "magic state", as used herein, is a quantum state which can be used with Clifford gates to provide arbitrary quantum operations and can be improved in fidelity by a circuit constructed from Clifford gates. Effectively, the use of a given magic state, or rather, a finite number of instances of the magic state, with the set of Clifford gates allows for universal quantum computation. It will be appreciated that the circuits herein describe transformations that can be reexpressed using different gate sets and in different bases without fundamentally changing their nature.

"Distillation", as used herein, refers to the process of probabilistically converting a set of qubits in a given state to produce a smaller set of qubits that assume the given state (or more generally, another state) with higher fidelity. In quantum information theory, fidelity is a measure of the "closeness" of two quantum states. As used herein, fidelity refers to the closeness of a given instance of a state to a desired ideal state. A "low-fidelity state" refers to a state that is below the level of fidelity desirable for use in a quantum computation but above a minimum fidelity needed for a distillation process.

Figure 1:
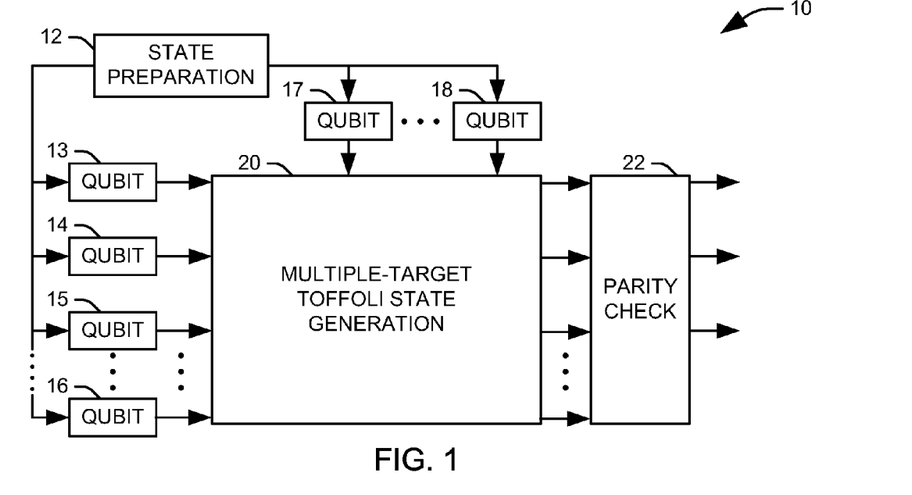
FIG. 1 illustrates a system for direct distillation of Toffoli states from single qubit magic states in accordance with an aspect of the present invention.

FIG. 1 illustrates a system 10 for direct distillation of Toffoli states from single qubit magic states in accordance with an aspect of the present invention. It will be appreciated that, while the various components of the system are displayed as discrete components, it is possible that the actual hardware used to implement the system could overlap across the various physical components as they are reused. The system 10 includes a state preparation component 12 that initializes a plurality of qubits 13-18 to respective desired initial states. It will be appreciated that the plurality of qubits 13-18 can each be stored in one or more physical components. After the initial state preparation, the system includes a first set of qubits 13 and 14, each storing an initial state that can be generated with high-fidelity using Clifford gates, and a second set of qubits 15 and 16, referred to as target qubits, each storing a relatively low-fidelity instance of the magic states. In one implementation, the single qubit magic state is one of a class of states equivalent to a +1 eigenstate of the Hadamard operator. By "equivalent," it is meant that each state can be derived from the others via one-qubit Clifford unitary operators. In addition to the target qubits 15 and 16, the system 10 will consume a number of low-fidelity magic states, stored in a third set of qubits 17 and 18.

Each of the qubits 13-18 are provided to an multiple-target Toffoli state preparation component 20. In accordance with an aspect of the present invention, the multiple-target Toffoli state preparation component 20 performs a series of gates on the first and second sets of qubits to place a system comprising the first set of qubits and the second set of qubits in a state:

$$\frac{1}{2}|000_1 \ldots 0_N\rangle + \frac{1}{2}|010_1 \ldots 0_N\rangle + \frac{1}{2}|100_1 \ldots 0_N\rangle + \frac{1}{2}|111_1 \ldots 1_N\rangle \quad \text{Eq. 1}$$

where the first two qubits in each entangled state represents the first set of qubits and the indexed qubits, 1 through N, represent the second set of qubits.

In one implementation, the multiple-target Toffoli state preparation component 20 includes a plurality of quantum circuit components arranged in series, with each quantum circuit component including a plurality of controlled NOT (CNOT) gates configured such that each of the second set of qubits states 15 and 16 are a target of one of the CNOT gates and each CNOT gate is controlled by one of the first set of qubits 13 and 14. Each quantum circuit component further comprises at least one rotation gate configured to provide a rotation around an axis of the Bloch sphere using at least one Clifford gate and at least one single qubit magic state stored in the third set of qubits. In one implementation, each rotation gate provides one of a rotation of $\pi/4$ radians around the Y-axis and a rotation of negative $\pi/4$ radians around the Y-axis to at least one of the second set of qubits 15 and 16.

The first and second sets of qubits 13-16 are then provided to parity check assembly 22. The parity check assembly 22 is configured to check the parity of the second set of qubits 15 and 16 to determine if any errors have occurred in the generation of the entangled state. Specifically, the parity check can include one or more gate operations on the second set of qubits 15 and 16 as well as measurement of all but one of the second set of qubits, leaving an unmeasured target qubit (e.g., 15). In accordance with an aspect of the present invention, after the parity check, the first qubit 13, the second qubit 14, and the unmeasured target qubit 15 represent a high-fidelity Toffoli state. This state can be used with the set of Clifford gates to provide a Toffoli gate, which is sufficient for universal quantum computing.

In one implementation, the parity assembly 22 includes at least one CNOT gate whose target and control bits are both members of the second set of quits 15 and 16. In other words, one of the at least one CNOT gates is controlled by a first qubit 15 of the second set of qubits and targets another qubit 16 of the second set of qubits. Each qubit in the second set of qubits that was targeted by a CNOT gate is then measured at a measurement assembly in a measurement basis perpendicular to the axis of the Bloch sphere around which each qubit 16 of the second set of qubits was rotated. In one implementation, the qubits 16 are measured in the standard (Z) basis.

Figure 2:
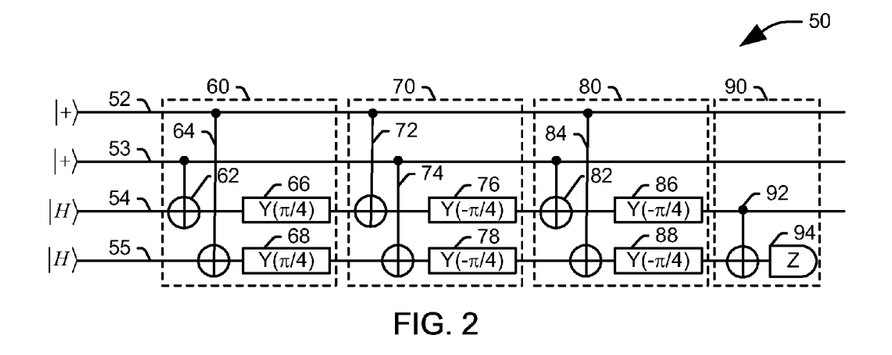
FIG. 2 illustrates one example of a quantum circuit for generating high-fidelity Toffoli states in accordance with an aspect of the present invention.

In one implementation, described in further detail in FIG. 2, the system utilizes six magic states comprising the third set of qubits and four initial qubits, with first and second qubits initialized in the plus state and third and fourth qubits, initialized in the magic state, forming the second set of qubits. In a first quantum circuit component, a first CNOT gate of the first quantum circuit targets the third qubit and is controlled by the second qubit, and a second CNOT gate of the first quantum circuit targets the fourth qubit and is controlled by the first qubit. The rotation gate is configured to provide a rotation of $\pi/4$ radians around the Y-axis to each of the third and fourth qubits.

In a second quantum circuit component, a first CNOT gate of the second quantum circuit targets the third qubit and is controlled by the first qubit, and the second CNOT gate of the second quantum circuit targets the fourth qubit and is controlled by the second qubit. The rotation gate is configured to provide a rotation of negative π/4 radians around the Y-axis to each of the third and fourth qubits. In a third quantum circuit component, a first CNOT gate of the third quantum circuit targets the third qubit and is controlled by the second qubit, and a second CNOT gate of the third quantum circuit targets the fourth qubit and is controlled by the first qubit. The rotation gate is configured to provide a rotation of negative π/4 radians around the Y-axis to each of the third and fourth qubits.

The parity check assembly 22 in this example comprises a single CNOT gate and a standard basis measurement assembly. The CNOT gate is controlled by the third qubit and targets the fourth qubit. The fourth qubit is then measured in the standard basis. Assuming no errors, the fourth qubit should be found to be in the ground state, and the first, second, and third qubit form a high-fidelity Toffoli ancilla state.

FIG. 2 illustrates one example of a quantum circuit 50 for generating high-fidelity Toffoli states in accordance with an aspect of the present invention. In the illustrated implementation, the magic state is an "H" state, that is, one of a family of states equivalent to the +1 eigenstate of the Hadamard operator. The specific magic state in this example can be represented in the standard basis as $|H\rangle = \cos(\pi/8)|0\rangle + \sin(\pi/8)|1\rangle$.

The quantum circuit includes four qubits 52-55, with first and second qubits 52 and 53 beginning in high-fidelity plus states, and third and fourth qubits 54 and 55 beginning in the H state. It will be appreciated that each of the high-fidelity states can be generated via initialization of a qubit to the ground (zero) state in the standard basis and a Hadamard gate operation on the initialized qubit to provide the plus state. The system also uses eight relatively low-fidelity H states, which includes the two H states initially stored in the third and fourth qubits 54 and 55, as well as six additional states that are utilized to produce Y-rotations within the quantum circuit 50.

Figure 3:
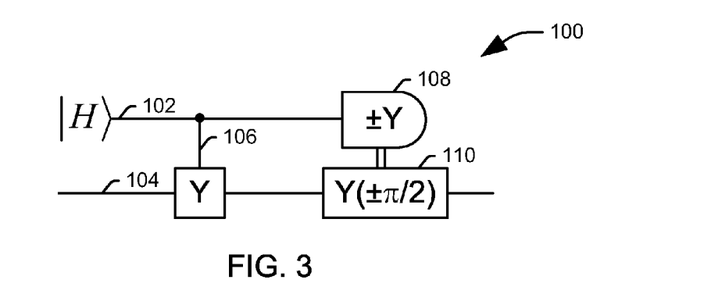
FIG. 3 illustrates an exemplary quantum circuit used for a Y-rotation via a magic state.

An exemplary Y-rotation gate 100 for providing a ±π/4 rotation to a target qubit is illustrated as FIG. 3 for reference. It will be appreciated that each Y-rotation consumes one of the prepared H states, stored in a qubit 102, to provide a rotation to a target qubit 104. The gate 100 includes a controlled Y gate 106, controlled by the ancilla qubit 102. The ancilla qubit 102 is then measured in the Y basis at a measurement assembly 108 to provide one of the eigenstates of the Y operator. A classically controlled rotation element 110 applies a π/2 rotation to the target qubit if a first eigenstate, specifically the −1 eigenstate, of the Y operator is measured at the measurement assembly 108, and applies no rotation to the target qubit if a second eigenstate, specifically the +1 eigenstate, of the Y operator is measured. It will be appreciated that, for a −π/4 rotation, the controls on the classically controlled rotation element 110 are modified, such that a −π/2 rotation is applied to the target qubit if the second eigenstate is measured at the measurement assembly 108, and no rotation is applied if the first eigenstate is measured.

Returning to FIG. 2, for the purpose of clarity of description, the quantum circuit is divided into four circuit components 60, 70, 80, and 90, each of which acts on the four qubits 52-55. A first circuit component 60 contains two controlled NOT (CNOT) gates 62 and 64. A first CNOT gate 62 targets the third qubit and is controlled by the second qubit. A second CNOT gate 64 targets the fourth qubit and is controlled by the first qubit. The third and fourth qubits are then provided to first and second Y-rotation gates 66 and 68, respectively. Each Y-rotation gate 66 and 68 then rotates its respective qubit by π/4 radians, consuming one of the low-fidelity H states in the process A second circuit component 70 contains third and fourth CNOT gates 72 and 74. The third CNOT gate 72 targets the third qubit and is controlled by the first qubit. The fourth CNOT gate 74 targets the fourth qubit and is controlled by the second qubit. The third and fourth qubits are then provided to respective third and fourth Y-rotation gates 76 and 78. Each Y-rotation gate 76 and 78 rotates its respective qubit by negative π/4 radians, such that the rotation is equal and opposite that provided by the first and second rotation gates 66 and 68.

A third circuit component 80 contains fifth and sixth CNOT gates 82 and 84. The fifth CNOT gate 82 targets the third qubit and is controlled by the second qubit. The sixth CNOT gate 84 targets the fourth qubit and is controlled by the first qubit. The third and fourth qubits are then provided to fifth and sixth Y-rotation gates 66 and 68, respectively. Each Y-rotation gate 66 and 68 rotates its respective qubit by negative π/4 radians. At the end of the third circuit component 80, assuming no error has been introduced, the system 50 formed by the qubits 52-55 can be represented as:

$$|\phi\rangle = \frac{1}{2}|0000\rangle + \frac{1}{2}|0100\rangle + \frac{1}{2}|1000\rangle + \frac{1}{2}|1111\rangle \qquad \text{Eq. 2}$$

A fourth circuit component 90 performs a parity check to provide a final output of the system. It will be noted that, in the absence of errors, measuring the third and forth 54 and 55 qubits in the Z-basis would yield the same result and thus a parity measurement will be zero. To this end, a seventh CNOT gate 92 targets the fourth qubit and is controlled by the third qubit. After the seventh CNOT gate, the state of the system can be represented as:

$$\frac{1}{2}|0000\rangle + \frac{1}{2}|0100\rangle + \frac{1}{2}|1000\rangle + \frac{1}{2}|1110\rangle \qquad \text{Eq. 3}$$

The fourth qubit 55 is then measured in the standard basis at a measurement assembly 94 to provide the parity measurement. Assuming that no error has occurred, the ground state (0) will be measured, and the first three qubits 52, 53, and 54 will be left in a high-fidelity Toffoli state. If the fourth qubit 55 is measured in the excited state (1), the output of the circuit 50 is discarded.

The inventor has shown that an error on an H state used to implement the quantum circuit 50 (either an initial state or consumed in a rotation) can be propagated to a Y error on the target qubit together with, possibly, Z errors on the control qubits. A single such error will thus be detected by the parity measurement while any two errors will go undetected. To lowest non-trivial order, the output error probability is thus $$\binom{8}{2} p^2 = 28\, p^2$$

and the acceptance probability is 1−8p, where p is the likelihood that a given H state will experience a Y error.

The probability of an undetected X (or Y) error on the output target qubit can be made arbitrarily small by generating more target qubits and checking their parities; the X (or Y)-error probability can be reduced to order $p^o$ by generating o target qubits and checking them against each other. This does not reduce the probability of a Z error on the output control qubits below order $p^2$; in fact, the constant in front of $p^2$ worsens as o becomes larger. Nonetheless, having reduced the probability of an X (or Y) error on the target qubit to the desired order, reduction of the Z-error probability on a control qubit can be achieved if one swaps the target qubit with the control qubit of the Toffoli ancilla using a pair of Hadamard gates.

This transformation takes Z errors on the former control qubit to X errors on the new target qubit. Toffoli ancilla that suffer only X errors on the target qubit and Z errors on the control qubits can be used to implement Toffoli gates that suffer only X errors on the target and Z errors on the (matching) controls. Consequently, a second order reduction in the probability of an error on the target qubit of such an ancilla can be achieved. Given Toffoli ancillae that suffer only X errors on the target qubit and Z errors on the control qubits, higher orders of error suppression can be achieved either by using multiple rounds of Toffoli distillation or/and by adding additional target qubits to be verified against one another. In this way, given H-type magic states with sufficiently small error probably, the probability of an error anywhere on the output Toffoli ancilla can be reduced dramatically compared to direct implementation of this ancilla using the H-type magic states.

The direct-to-Toffoli distillation circuit of FIG. 2 provides a significant advance in efficiency over existing methods, which generate the Toffoli states and distill the magic states in a separate process. This routine cannot be directly compared to magic-state distillation routines for H-type magic states since the output is not an H-type magic state. Many quantum algorithms require magic-states primarily for use in the implementation of Toffoli gates, however, and for this purpose, the most sensible comparison is of the resources required to implement an improved Toffoli gate using a more traditional routine. The state cost for implementing a Toffoli gate, that is, the number of copies of magic states required per improved Toffoli gate, is easily calculated.

Using the quantum circuit of FIG. 2, eight H-type magic states which suffer Y errors with probability p are required to implement a single Toffoli gate which suffers errors with probability order $p^2$. The state cost required for distilling an H-type magic state with quadratically reduced error has been shown to be no more than three. The traditional decomposition of the Toffoli gate in terms of Clifford gates and $\pi/4$ rotations requires seven $\pi/4$ rotations, although a Margolus-Toffoli gate frequently can be used as an adequate stand-in, and can be implemented using Clifford gates and only four $\pi/4$ rotations. The state cost is thus reduced to eight from twenty or twelve, using the inventor's other work, a savings of sixty percent and thirty-three percent, respectively.

Another quantity of interest is the location cost for implementing a Toffoli gate, that is, the number of locations required to implement an improved Toffoli gate using a given routine. Counting only one-qubit Clifford state preparations and two-qubit Clifford gates as taking non-zero time, the number of locations in the direct-to-Toffoli distillation routine of FIG. 2 where $Y(\pm\pi/4)$ gates are implemented as illustrated in FIG. 3 is thirty-six. The number of additional locations required to implement a Toffoli gate using the resultant Toffoli ancilla is fifteen. The total resource cost is thus fifty-one locations and eight H states. If each H state is injected from a lower level of computation using a process that requires five locations, then the location cost becomes ninety-one locations per Toffoli gate.

By comparison, using the published routine with the best location cost for distilling H states with quadratically suppressed errors assuming the input states are injected from a lower level of computation is sixty-five. Other work done by the inventor can improve this number to fifty.

For magic-state distillation routines with cost of this size, the most efficient method of implementing the Toffoli gate appears to be preparing a Toffoli state and then using this state to implement a Toffoli gate. However, since the Margolus-Toffoli gate can be implemented more compactly and such a Toffoli-like gate is often sufficient, it can be used as a basis of comparison. For one example of a Margolus-Toffoli gate, the resource overhead is twenty-five locations and four H states. Using the best generally available distillation routine, this works out to a total location cost of two hundred eighty-five. The comparable number using the inventor's other work is two hundred forty-one. The savings in the location cost compared to generally available routines is thus sixty-eight percent while the savings compared to a routine implemented with the inventor's other work is sixty-two percent.

Figure 4:
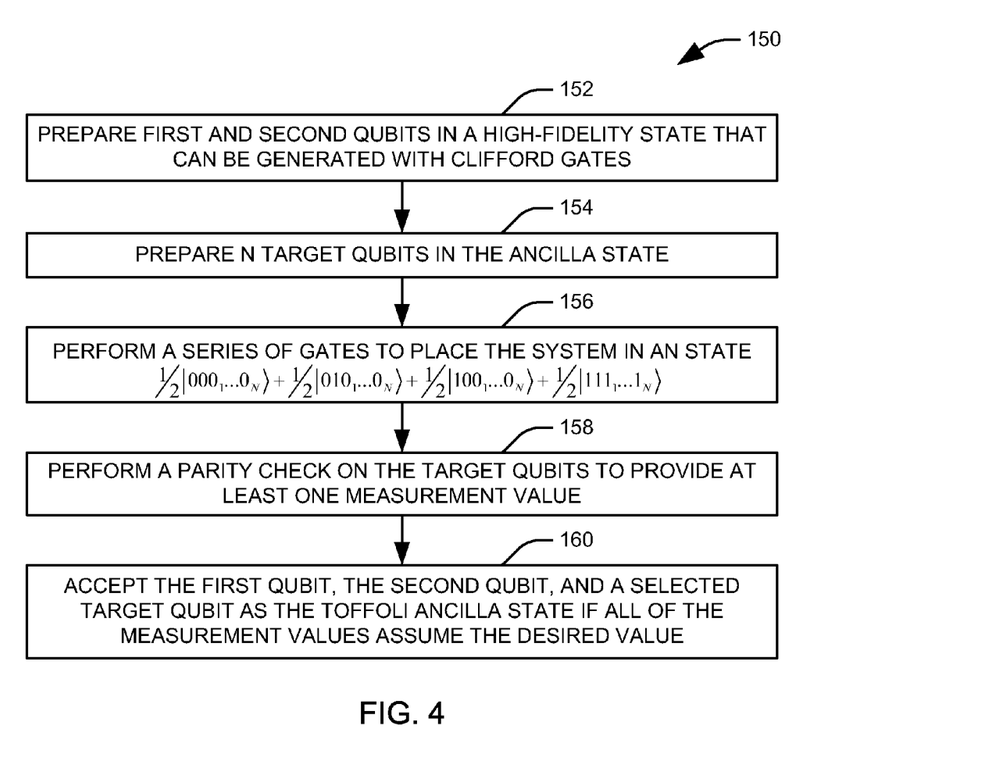
FIG. 4 illustrates one example of a method for generating a Toffoli state, having a first fidelity, from a plurality of single qubit magic states having a second fidelity such that using the single qubit magic states to construct a Toffoli state directly would result in a Toffoli state with fidelity less than the first fidelity.
Figure 5:
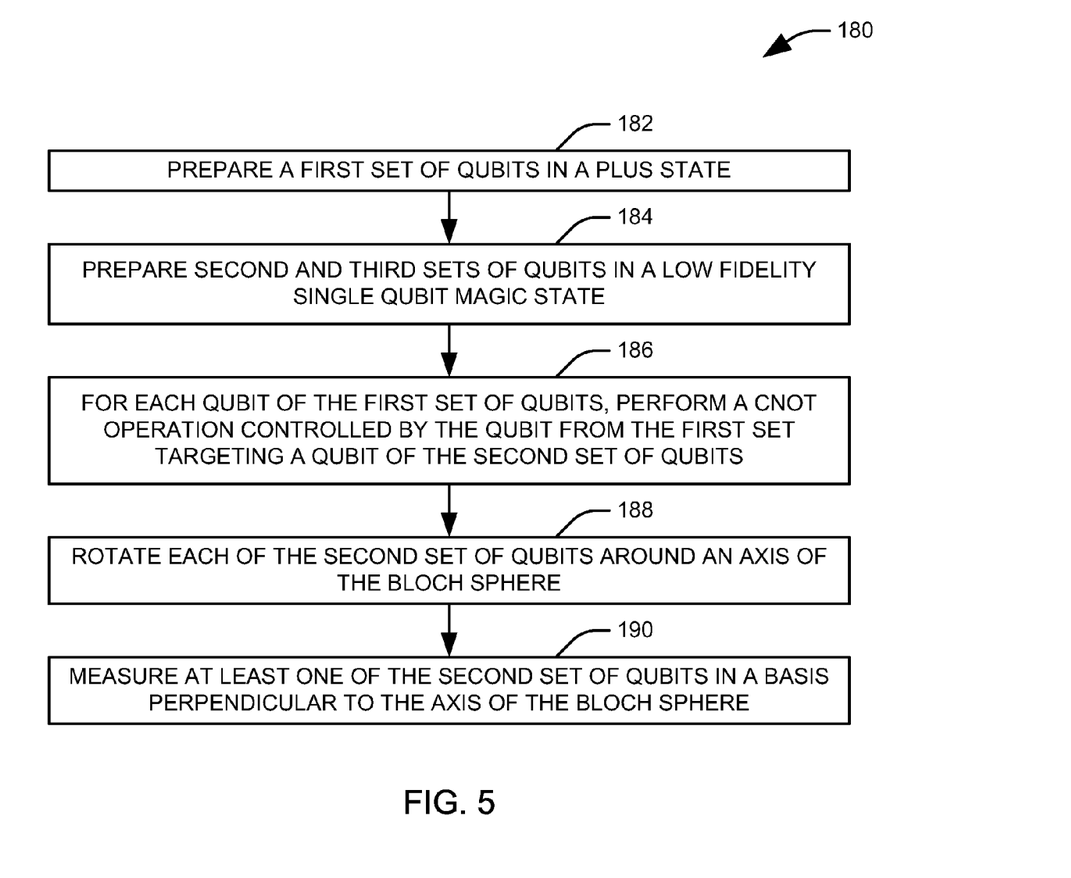
FIG. 5 illustrates another example of a method for generating a Toffoli state, having a first fidelity, from a plurality of single qubit states having a second fidelity such that using the single qubit magic states to construct a Toffoli state directly would result in a Toffoli state with fidelity less than the first fidelity.

In view of the foregoing structural and functional features described above in FIGS. 1-3, example methodologies will be better appreciated with reference to FIGS. 4 and 5. While, for purposes of simplicity of explanation, the methodologies of FIGS. 4 and 5 are shown and described as executing serially, it is to be understood and appreciated that the present invention is not limited by the illustrated order, as some actions could in other examples occur in different orders and/or concurrently from that shown and described herein.

FIG. 4 illustrates an example of a method 150 for generating a Toffoli state, having a first fidelity, from a plurality of single qubit magic states having a second fidelity such that using the single qubit magic states to construct a Toffoli state directly would result in a Toffoli state with fidelity less than the first fidelity. At 152, first and second qubits are prepared in a quantum state that can be achieved with high-fidelity with the set of Clifford gates. It will be appreciated that, for the Clifford set, achievable high-fidelity states, assuming a high-fidelity initialization to the ground state in the standard basis, can include at least either eigenstate of the Z operator (i.e., the zero and one states of the standard basis) and either eigenstate of the X operator (i.e., the plus and minus states). In one implementation, the first set of qubits includes two qubits prepared in the plus state. At 154, N target qubits are prepared in the single qubit magic state. In one example, the single qubit magic states can be magic states of the Clifford set and include one of a class of states equivalent to the +1 eigenstate of the Hadamard operator. It will be appreciated that additional copies of the magic state may also be prepared and utilized as part of the method.

At 156, a series of gates is performed on the first qubit, the second qubit, and the N of target qubits as to place the system, assuming no error has been introduced by the relatively low-fidelity ancilla states, in a state:

$$\tfrac{1}{2}|000_1\ldots 0_N\rangle + \tfrac{1}{2}|010_1\ldots 0_N\rangle + \tfrac{1}{2}|100_1\ldots 0_N\rangle + \tfrac{1}{2}|111_1\ldots 1_N\rangle \qquad \text{Eq. 4}$$

For example, the series of gates can include one or more quantum circuit components that each perform, for each of the first and second qubits, at least one controlled NOT operation targeting each of the target qubits and a rotation of each target qubit around an axis of the Bloch sphere. In an exemplary implementation, the rotation for each target qubit includes performing a controlled Y operation on the target qubit that is controlled by a qubit storing the H-type magic state, measuring the control qubit in the Y basis to provide one of a first value and a second value, and performing a Y-rotation on the target qubit of either nothing or positive or negative $\pi/2$ radians according to the measured value.

At 158, a parity check is performed on the N target qubits to provide at least one measurement value. In one implementation, a selected target qubit is the control qubit for a CNOT gate targeting one or more other target qubits, and each target qubit other than the selected target qubit is measured in the standard basis. If any of the at least one measurement values does not assume a desired value, an error is indicated and the state of the first qubit, the second qubit, and the selected target qubit is discarded. If all of the measurement values assume the respective desired values, the system formed by the first qubit, the second qubit, and the selected target qubit are accepted as a high-fidelity Toffoli state at 160.

FIG. 5 illustrates another example of method 180 for generating a Toffoli state, having a first fidelity, from a plurality of single qubit magic states having a second fidelity such that using the single qubit magic states to construct a Toffoli state directly would result in a Toffoli state with fidelity less than the first fidelity in accordance with an aspect of the present invention. At 182, a first set of qubits are prepared in the plus state. At 184, each of a second set of qubits and a third set of qubits are prepared in the single qubit magic state. It will be appreciated that the single qubit magic states cannot be directly generated with high-fidelity efficiently, and thus, in accordance with an aspect of the present invention, each of the single qubit magic states are provided with relatively low-fidelity. In one example, the single qubit magic states include one of a class of states equivalent to the +1 eigenstate of the Hadamard operator.

At 186, for each qubit of the first set of qubits, a controlled NOT operation is performed targeting a qubit of the second set of qubits. At 188, a rotation of each qubit of the second set of qubits around an axis of the Bloch sphere is performed. The rotation can be performed using at least one Clifford gate and at least one single qubit magic state stored in the third set of qubits. In one implementation, the rotation of each qubit can be either a positive or a negative $\pi/4$ rotation around the Y-axis. It will be appreciated that 186 and 188 can be repeated multiple times in some implementations.

At 190, at least one of the second set of qubits is measured in a measurement basis perpendicular to the axis of the Bloch sphere around which each qubit of the second set of qubits was rotated. In one example, the qubits are measured in the standard basis. Assuming that at least one measurement does not indicate an error, a Toffoli state is formed by the first and second qubits of the first set of qubits and a given qubit of the second set of qubits.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A method for generating a Toffoli state, having a first fidelity, from a plurality of single qubit magic states having a second fidelity such that using the single qubit magic states to construct a Toffoli state directly would result in a Toffoli state with fidelity less than the first fidelity comprising:
   preparing each of first and second qubits in a high-fidelity state that can be generated with a set of Clifford gates;
   preparing N target qubits in the single qubit magic state, where N is an integer greater than one;
   performing a series of gates on the first qubit, the second qubits, and the N target qubits, such that a system comprising the first qubit, the second qubits, and the N target qubits is in a state $\frac{1}{2}|000_1 \ldots 0_N\rangle + \frac{1}{2}|010_1 \ldots 0_N\rangle + \frac{1}{2}|100_1 \ldots 0_N\rangle + \frac{1}{2}|111_1 \ldots 1_N\rangle$, wherein the indexed values 1 through N represent the N target qubits;
   performing a parity check on the N target qubits to provide at least a first measurement value; and
   accepting the first qubit, the second qubit, and a first target qubit as the Toffoli state if the first measurement values assume a desired value.

2. The method of claim 1, wherein performing a series of gates on the first qubit, the second qubit, and the N target qubits comprises:
   performing, for each of the first and second qubits, at least one controlled NOT operation targeting each of the target qubits; and
   performing a rotation of each target qubit around an axis of the Bloch sphere using at least one Clifford gate and at least one single qubit magic state.

3. The method of claim 2, wherein performing the rotation of each target qubit around an axis of the Bloch sphere comprises performing a rotation of each target qubit by positive or negative $\pi/4$ radians around a Y-axis of the Bloch sphere.

4. The method of claim 3, wherein the performing the rotation of each target qubit comprises:
   performing a controlled Y operation targeting the target qubit that is controlled by a qubit storing one of plurality of single qubit magic states;
   measuring the target qubit in the Y basis to provide one of a first value and a second value;
   performing a rotation of the target qubit by positive or negative $\pi/2$ radians around the Y-axis if the first value is measured; and
   performing no rotation of the target qubit if the second value is measured.

5. The method of claim 1, wherein performing the parity check on the N target qubits comprises performing a CNOT gate controlled by the first target qubit targeting at least one other target qubit of the N target qubits and measuring the at least one target qubit other than the first target qubit in the standard basis.

6. The method of claim 1, wherein performing the series of gates on the first qubit, the second qubits, and the N target qubits comprises:
   performing a first CNOT gate targeting each target qubit, the first CNOT gate on each target qubit being controlled by a given one of the first qubit and the second qubit;
   performing a first rotation of each target qubit in a first direction around an axis of the Bloch sphere using at least one gate of the Clifford set of gates and at least one single qubit magic state;
   performing a second CNOT gate targeting each target qubit, the second CNOT gate on each target qubit being controlled by an other one of the first qubit and the second qubit that was not used in the first CNOT gate;
   performing a second rotation of each target qubit in a second direction around the axis of the Bloch sphere using at least one gate of the Clifford set of gates and at least one single qubit magic state;
   performing a third CNOT gate targeting each target qubit, the third CNOT gate on each target qubit being controlled by the same of the first qubit and the second qubit used in performing the first CNOT gate targeting each target qubit; and
   performing a third rotation of each target qubit in the second direction around the axis of the Bloch sphere using at least one gate of the Clifford set of gates and at least one single qubit magic state.

7. The method of claim 6, wherein performing the first CNOT gate targeting each target qubit comprises controlling the CNOT gate targeting a first target qubit with the second qubit and controlling the CNOT gate targeting the second target qubit with the first qubit.

8. The method of claim 6, wherein performing the first rotation of each target qubit comprises performing a $\pi/4$ rotation around a Y-axis of the Bloch sphere, and each of performing the second rotation of each target qubit and performing the third rotation of each target qubit comprises performing a $-\pi/4$ rotation around the Y-axis of the Bloch sphere.

9. The method of claim 1, wherein preparing N target qubits in the single qubit magic state comprises preparing the N target qubits in one of a class of states equivalent to an eigenstate of the Hadamard operator.

10. A system for providing three qubits in a high-fidelity Toffoli state from a plurality of instances of a magic state comprising:
   first and second qubits, each storing a high-fidelity state that can be generated by Clifford gates;
   N target qubits, each storing an instance of the magic state;
   an multiple-target Toffoli state preparation component configured to perform a series of gates on the first qubit, second qubit, and the N target qubits to place the system in a state $\frac{1}{2}|000_1 \ldots 0_N\rangle + \frac{1}{2}|010_1 \ldots 0_N\rangle + \frac{1}{2}|100_1 \ldots 0_N\rangle + \frac{1}{2}|111_1 \ldots 1_N\rangle$, wherein the indexed values 1 through N represent the N target qubits; and
   a parity check component configured to check the parity of the N target qubits, the parity check comprising measurements on N−1 target qubits to provide an unmeasured target qubit.

11. The system of claim 10, the multiple-target Toffoli state preparation component comprising a plurality of quantum circuits, arranged in series, each of the quantum circuits comprising:
   a first controlled NOT (CNOT) gate configured such that a first target qubit of the N target qubits is a target of the first CNOT gate and one of the first and second qubits is a control qubit of the first CNOT gate;
   a second CNOT gate configured such that a second target qubit of the N target qubits is a target of the second CNOT gate and an other of the first and second qubits is a control qubit of the second CNOT gate; and
   a rotation gate configured to provide one of a rotation of $\pi/4$ radians around the Y-axis and a rotation of negative $\pi/4$ radians around the Y-axis to at least one of the N target qubits.

12. The system of claim 11, wherein the plurality of quantum circuits comprises:
   a first quantum circuit in which the first CNOT gate of the first quantum circuit is controlled by the second qubit and targets the first target qubit, the second CNOT gate of the first quantum circuit is controlled by the first qubit and targets the second target qubit, and the rotation gate is configured to provide a rotation of $\pi/4$ radians around the Y-axis to each of the first and second target qubits;
   a second quantum circuit in which the first CNOT gate of the second quantum circuit is controlled by the first qubit and targets the first target qubit, the second CNOT gate of the second quantum circuit is controlled by the second qubit and targets the second target qubit, and the rotation gate is configured to provide a rotation of negative $\pi/4$ radians around the Y-axis to each of the first and second target qubits; and
   a third quantum circuit in which the first CNOT gate of the third quantum circuit is controlled by the second qubit and targets the first target qubit, the second CNOT gate of the third quantum circuit is controlled by the first qubit and targets the second target qubit, and the rotation gate is configured to provide a rotation of negative $\pi/4$ radians around the Y-axis to each of the first and second target qubits.

13. The system of claim 10, wherein the parity check component comprises a CNOT gate controlled by the unmeasured target qubit and targeting one of the N−1 target qubits.

14. The system of claim 10, wherein the magic state associated with the set of Clifford gates is one of a class of states equivalent to an eigenstate of the Hadamard operator.

15. A method for generating a Toffoli state, having a first fidelity, from a plurality of single qubit magic states having a second fidelity such that using the single qubit magic states to construct a Toffoli state directly would result in a Toffoli state with fidelity less than the first fidelity comprising:
   preparing each of a first set of qubits in a plus state;
   preparing each of a second set of qubits in one of the plurality of single qubit magic states;
   preparing each of a third set of qubits in one of the plurality of single qubit magic states;
   performing, for each qubit of the first set of qubits, a controlled NOT (CNOT) operation targeting a qubit of the second set of qubits;
   performing a rotation of each qubit of the second set of qubits around an axis of the Bloch sphere using at least one Clifford gate and at least one single qubit magic state stored in the third set of qubits; and
   measuring at least one of the second set of qubits in a measurement basis perpendicular to the axis of the Bloch sphere around which each qubit of the second set of qubits was rotated.

16. The method of claim 15, wherein the CNOT operation is a first CNOT operation and the method further comprising performing, for each qubit of the first set of qubits, a second CNOT operation targeting a different qubit of the second set of qubits, such that the second CNOT operation targeting a given one of the second set of qubits is controlled by a qubit of the first set of qubits that was not used in the first CNOT operation on the given one of the second set of qubits.

17. The method of claim 16, wherein the rotation is a first rotation and further comprising performing a second rotation of each qubit of the second set of qubits around the axis of the Bloch sphere using at least one Clifford gate and at least one other single qubit magic state stored in the third set of qubits, the second rotation being equal and opposite to the first rotation.

18. The method of claim 15, wherein performing the rotation of each qubit of the second set of qubits around the axis of the Bloch sphere comprises performing one of a rotation of $\pi/4$ radians around the Y-axis and a rotation of negative $\pi/4$ radians around the Y-axis.

19. The method of claim 18, wherein performing the rotation of a given qubit of the second set of qubits comprises:
   performing a controlled Y operation targeting the given qubit that is controlled by a selected qubit of the third set of qubits, the qubit storing one of the at least one single qubit magic states;
   measuring the selected qubit in the Y basis to provide one of a first value and a second value;

performing a rotation of the given qubit by $\pi/2$ radians around the Y-axis if the first value is measured; and performing no rotation of the given qubit if the second value is measured.

20. The method of claim 15, further comprising performing a CNOT operation controlled by a first qubit of the second set of qubits and targeting at least one other qubit of the second set of qubits.

* * * * *